United States Patent
Keren

(10) Patent No.: US 10,517,236 B2
(45) Date of Patent: Dec. 31, 2019

(54) DRIP EMITTER

(71) Applicant: Netafim, Ltd., Tel Aviv (IL)

(72) Inventor: Ron Keren, Kibbutz Hatzerim (IL)

(73) Assignee: Netafim, Ltd., Tel Aviv (IL)

( * ) Notice: Subject to any disclaimer, the term of this patent is extended or adjusted under 35 U.S.C. 154(b) by 0 days.

(21) Appl. No.: 15/101,110

(22) PCT Filed: Nov. 22, 2014

(86) PCT No.: PCT/IB2014/066264
§ 371 (c)(1),
(2) Date: Jun. 2, 2016

(87) PCT Pub. No.: WO2015/083032
PCT Pub. Date: Jun. 11, 2015

(65) Prior Publication Data
US 2018/0110191 A1    Apr. 26, 2018

Related U.S. Application Data

(60) Provisional application No. 61/911,236, filed on Dec. 3, 2013.

(51) Int. Cl.
*A01G 25/02*    (2006.01)
(52) U.S. Cl.
CPC .......... *A01G 25/023* (2013.01); *Y02A 40/237* (2018.01)
(58) Field of Classification Search
CPC .... A01G 25/02; A01G 25/023; A01G 25/026; F02A 40/237
USPC ................................. 239/542, 547
See application file for complete search history.

(56) References Cited

U.S. PATENT DOCUMENTS

| | | | |
|---|---|---|---|
| 6,250,571 B1* | 6/2001 | Cohen | A01G 25/023 239/542 |
| 7,681,810 B2* | 3/2010 | Keren | A01G 25/02 138/42 |
| 8,317,111 B2* | 11/2012 | Cohen | A01G 25/023 239/542 |
| 8,763,934 B2* | 7/2014 | Patel | A01G 25/023 239/542 |
| 8,998,113 B2* | 4/2015 | Keren | A01G 25/023 239/542 |
| 9,485,923 B2* | 11/2016 | Ensworth | A01G 25/026 |

(Continued)

FOREIGN PATENT DOCUMENTS

| | | |
|---|---|---|
| WO | WO 2012/137200 | 10/2012 |
| WO | WO 2014/016832 | 1/2014 |

OTHER PUBLICATIONS

International Search Report dated Apr. 9, 2015 in counterpart International (PCT) Application No. PCT/IB2014/066264.

(Continued)

*Primary Examiner* — Alexander M Valvis
(74) *Attorney, Agent, or Firm* — Womble Bond Dickinson (US) LLP

(57) ABSTRACT

A drip irrigation emitter is provided extending between first and second longitudinal ends. The emitter has an outer side for attaching to a pipe that is laterally bound between first and second longitudinal edges. The outer side has a flow path and an exit pool, and at least a section of the flow path extends downstream along the first edge and at least a portion of the exit pool is formed between the section of the flow path and the second edge.

20 Claims, 7 Drawing Sheets

(56) References Cited

U.S. PATENT DOCUMENTS

| | | |
|---|---|---|
| 2005/0284966 A1* | 12/2005 | DeFrank .............. A01G 25/023 239/542 |
| 2012/0012682 A1 | 1/2012 | Einav |
| 2013/0248616 A1 | 9/2013 | Ensworth et al. |
| 2014/0070029 A1 | 3/2014 | Alkalay |
| 2014/0246520 A1 | 9/2014 | Einav |
| 2015/0150199 A1 | 6/2015 | Kidachi |
| 2015/0201568 A1 | 7/2015 | Einav |

OTHER PUBLICATIONS

Written Opinion dated Apr. 9, 2015 in counterpart International (PCT) Application No. PCT/IB2014/066264.

* cited by examiner

DRIP EMITTER

RELATED APPLICATIONS

This is a 35 USC 371 U.S. National Phase of International Application No. PCT/IB2014/066264, filed 22 Nov. 2014 and published in English as WO 2015/083032A1 on 11 Jun. 2015, which claims priority to U.S. Provisional application No. 61/911,236, filed 3 Dec. 2013. The contents of the aforementioned applications are incorporated by reference in their entirety.

TECHNICAL FIELD

Embodiments of the invention relate to drip irrigation emitters and to methods of retaining together parts of emitters.

BACKGROUND

Drip irrigation emitters may be formed from several parts, such as an outer housing formed e.g. from two members. Drip emitters typically include an inlet through which liquid flowing in a pipe can enter the emitter and an outlet through which liquid that entered the emitter can exit to the outside environment. In addition drip emitters typically include liquid cavities such as an exit pool at a side of the emitter that is fitted to the pipe, a flow path formed at least in part of a flow restricting path, and a pressure regulating chamber.

The flow restricting path functions to control the rate at which liquid is discharged by the emitter and is normally referred to as a "labyrinth channel" or "labyrinth". Through the flow restricting path liquid that enters the emitter must flow to reach the emitter outlet where it empties via the exit pool to the outside. The flow restricting path is a high resistance flow channel along which pressure of liquid flowing through the emitter drops relatively rapidly with distance along the path. Therefore, in some cases it may be advantageous to form the flow restricting path longer.

A resiliently flexible component often referred to as a membrane or diaphragm may be used in an emitter as part of the pressure regulating chamber to control the rate of liquid flowing out of the emitter, so that it is substantially independent of inlet pressure for a range of pressures typically encountered in irrigation applications which may be equal to a flow rate between about 0.4 and 12 liters per hour (l/h). The membrane is usually located between the inlet and the outlet and may contain at one side liquid that enters the emitter inlet to pass through the labyrinth and at the other side liquid that already passed through the labyrinth and reached a pressure regulating chamber that in some cases is located adjacent the emitter outlet.

The pressure regulating chamber typically has a wider cross section than the labyrinth emptying into it, in order to provide improved pressure regulating performance for the emitter. The membrane in response to increase in pressure of the entering liquid, may flex into the pressure regulating chamber to restrict the flow of liquid exiting the outlet and by that act to control the rate of liquid flowing out of the emitter.

Various types of connections may be used in order to retrain together parts of a drip irrigation emitter and in particular parts constituting outer housing members of the emitter. In addition, various considerations may be taken as to how to arrange the liquid cavities of the emitter one relative to the other in order to obtain an optimal design for the intended use and performance of the emitter.

U.S. Pat. No. 6,206,305 describes an emitter unit adapted to be integrally bonded to an internal surface of a pipe. The emitter has an outer housing, an inlet that communicates with an interior of the pipe; an outlet that communicates with an outlet of the pipe and a flow-restricting path. The housing is of closed box-like shape and includes a receiving member and a corresponding cover member. Projection and recess inter-engaging means formed on these members are adapted to form a close pressure fit to ensure effective retention between these members after assembly and prior to being bonded to a pipe. The emitter further includes a pressure regulating chamber and a flow restricting path located within the housing and an exit pool at an outer side of the housing where the emitter bonds to the pipe.

PCT publication WO2012137200 describes a drip emitter integrally installed within a pipe. The emitter has a body which at its side that is affixed to the internal wall of the pipe is formed with an exit pool that is elongated in its dimensions and substantially extends along the entire length of the body. The emitter in addition has at this side that attaches to the pipe a flow passage that circumferentially surrounds the elongated exit pool in order to impart to the emitter a symmetric configuration at the side connecting to the pipe and by that cancel the need for adjustment of orientation of the dripper before being fitted to a pipe.

SUMMARY

The following embodiments and aspects thereof are described and illustrated in conjunction with systems, tools and methods which are meant to be exemplary and illustrative, not limiting in scope.

In accordance with one embodiment of the present invention there is provided a drip irrigation emitter extending between first and second longitudinal ends, the emitter comprising an outer side for attaching to a pipe that is laterally bound between first and second longitudinal edges.

The outer side may be heat bonded to the pipe and attachment may preferably be to an inner side of a wall of the pipe. The first and second longitudinal edges bounding the outer side of the emitter possibly define also lateral extremities where the outer side is still attached to the pipe where beyond these extremities the emitter is not attached to the pipe and generally slopes away from the inner side of the wall of the pipe.

The outer side comprises a flow path and an exit pool, wherein at least a section of the flow path extends downstream along the first edge and at least a portion of the exit pool is formed between the section of the flow path and the second edge, i.e. extending up to adjacent the second edge with no other e.g. liquid formation therebetween.

The exit pool may be defined as having a maximal longitudinal extension possibly extending along all (or a large portion) of the section of the flow path that extends along the first edge. The exit pool may in addition be defined as having a maximal lateral extension at e.g. the at least portion of the pool that is formed between the section of the flow path and the second edge.

The maximal longitudinal extension, possibly at least 5 mm long, is configured to provide a sufficient length to enable a means, such as a drill, penetrating the pipe—to penetrate the pipe at a location above the exit pool. The maximal lateral extension is adapted to e.g. compensate for lateral distortions formed during formation of a drip pipe, such as by twisting of the pipe, so as to similarly provide a sufficient, here lateral extension, for the means penetrating the pipe—to penetrate the pipe at a location above the exit pool.

Possibly, the section of the flow path constitutes a full length of the flow path, while in other cases the section constitutes a first section that may be followed by one or more sections of the flow path that possibly partially surround a narrow portion of the exit pool possible including an outlet of the emitter.

In one form of the invention, an embodiment is provided where the emitter comprises a first member comprises the outer side and also comprises a lower inner side comprising a cavity. The cavity in the emitter may form a pressure regulating chamber of the emitter when e.g. covered by a membrane and such chamber may be for controlling the rate of liquid flowing out of the emitter, so that it is substantially independent of inlet pressure for a range of pressures typically encountered in irrigation applications.

In a preferred embodiment the flow path extends downstream to a terminal end where in communicates with the cavity and preferable a full length of the flow path is a pressure reducing path, possible including opposing array of baffle teeth between which liquid is restricted to flow.

Communication with the cavity may be via a passage through which the flow path communicates downstream with the cavity or chamber and from which further communication downstream is via a passage forming an outlet of the emitter through which liquid can flow downstream to the exit pool and from there to the outside environment.

According to an aspect of the present invention there is thus provided a drip emitter with an optimized arrangement of liquid cavities. Such optimization may be provided on the one hand by an a-symmetric arrangement of cavities on the outer side attaching to the pipe that allows for a long extension of the flow path along one lateral edge of this side (possible along substantially all this lateral edge) while leaving a relatively large space for an exit pool to be formed along all or most of the longitudinal extension of this side and between the flow path and the other lateral edge (or at least a part of the other lateral edge) of this side. On the other hand locating the flow path on the outer side leaves room for a relatively large sized cavity or pressure regulating chamber to be formed at another location on the emitter preferable at an opposing side to the outer side.

In accordance with an aspect of the present invention there is also provided a method of forming a drip irrigation pipe fitted with embodiments of emitters according to the present invention including such a-symmetrically outer sides. The method involves providing a pipe formed about a pipe axis and providing a plurality of drip emitters, each emitter extending between first and second longitudinal ends and comprising an outer side extending along a longitudinal axis and being laterally bound between first and second longitudinal edges equally spaced from the longitudinal axis.

The method further comprises a step of orienting each emitter such that its longitudinal axis is generally parallel to the pipe axis and then fitting each emitter to a wall of the pipe, while forming then an aperture through the wall above the outer side of each emitter at a location laterally set aside from the emitters longitudinal axis.

In accordance with an aspect of the present invention there is also provided a drip irrigation emitter comprising first and second longitudinally extending members, only the first member being adapted to attach at an outer side to a pipe and the second part being adapted to attach by snap-fit engagement to the first member, wherein the second member comprises a base and a peripheral wall that rises up above the base to enclose a recess, the first member comprises an inner side and a peripheral surface that extends a height distance from the inner side up towards the outer side, and the first member is at least partially located in the recess with the wall surrounding the peripheral surface along at least part of the height.

Possibly, the wall comprises along at least part of its periphery a plurality of teeth projecting into the recess, the peripheral surface comprising along at least part of its periphery a ledge, and at least some teeth are adapted to engage the ledge from above.

Preferably, the teeth bear against the ledge from above to press the first member towards the second member.

Typically, the emitter comprising valleys formed on both sides of each tooth.

If desired, the first and second members are formed from different materials, with preferably the material of the second member being harder and/or stronger than the material of the first member.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

DETAILED DESCRIPTION

Figure 1:
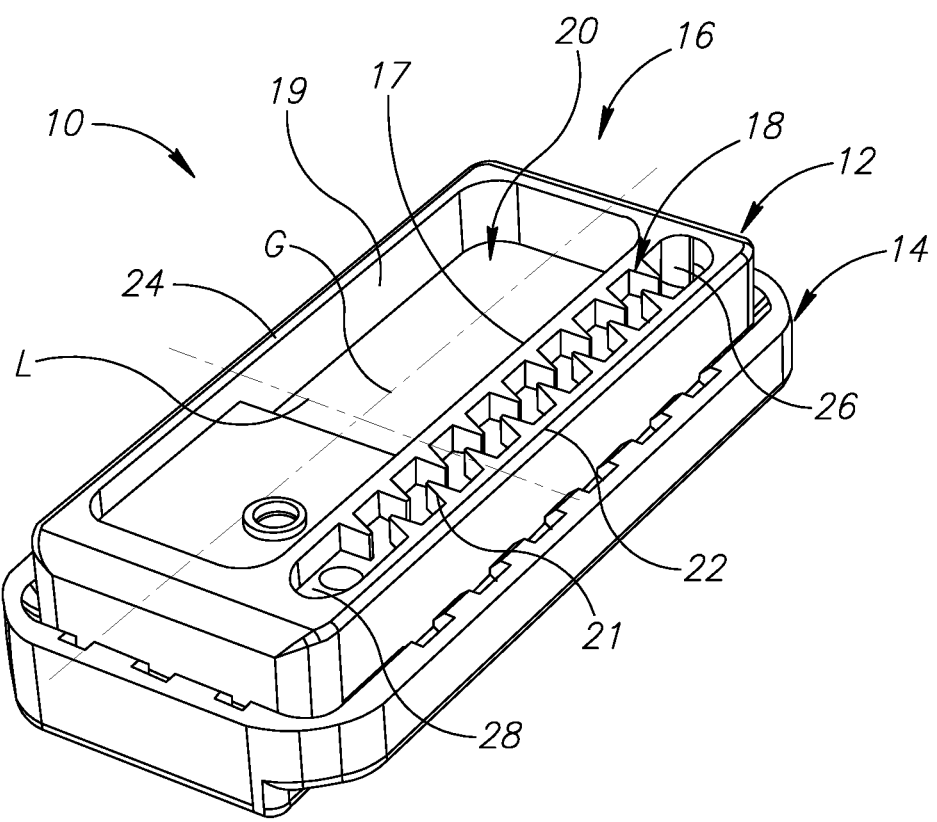
FIG. 1 schematically shows a perspective top view of an embodiment of an emitter in accordance with the present invention including first and second members.

Attention is first drawn to FIG. 1 showing a drip irrigation emitter 10 according to an embodiment of the present invention that possibly includes a first member 12 and a second member 14. The first member has an outer side 16 here fully visible that is formed with a flow path 18 alongside an exit pool 20 of the emitter. Flow path 18 here is formed, optionally, along its full length as a flow restricting path, possibly, including arrays of opposing baffle teeth 21 for creating high resistance to liquid flow. The first and second members possibly each have an elongated form and emitter 10 is adapted to attach preferably by heat bonding to an inner side of a pipe 23 at outer side 16 (pipe seen e.g. in FIG. 4).

It should be noted that directional terms appearing throughout the specification and claims, e.g. "forward", "rear", "up", "down" etc., (and derivatives thereof) are for illustrative purposes only, and are not intended to limit the scope of the appended claims. In addition it is noted that the directional terms "down", "below" and "lower" (and derivatives thereof) define identical directions.

Outer side 16 is laterally bound between two longitudinally extending edges 22, 24 and exit pool 20 is laterally bound between two longitudinal and opposing facing flanks 17, 19. Flow path 18 extends longitudinally in this embodiment along only one of the edges 22 from a beginning 26 to an end 28 and exit pool 20 extends longitudinally between flow path 18 and the other edge 24, with a first one of the flanks 17 of exit pool 20 being adjacent flow path 18 and a second one of the flanks 19 of exit pool 20 adjacent edge 24. First member 12 thus in the shown embodiment includes on its outer side 16, side by side, only one single flow path 18 and one single exit pool 20, such that a lateral axis L, perpendicular to the longitudinal axis G, extending from edge 22 towards edge 24 crosses: first flow path 18, immediately thereafter exit pool 20, while immediately thereafter reaching edge 24.

Figure 2:
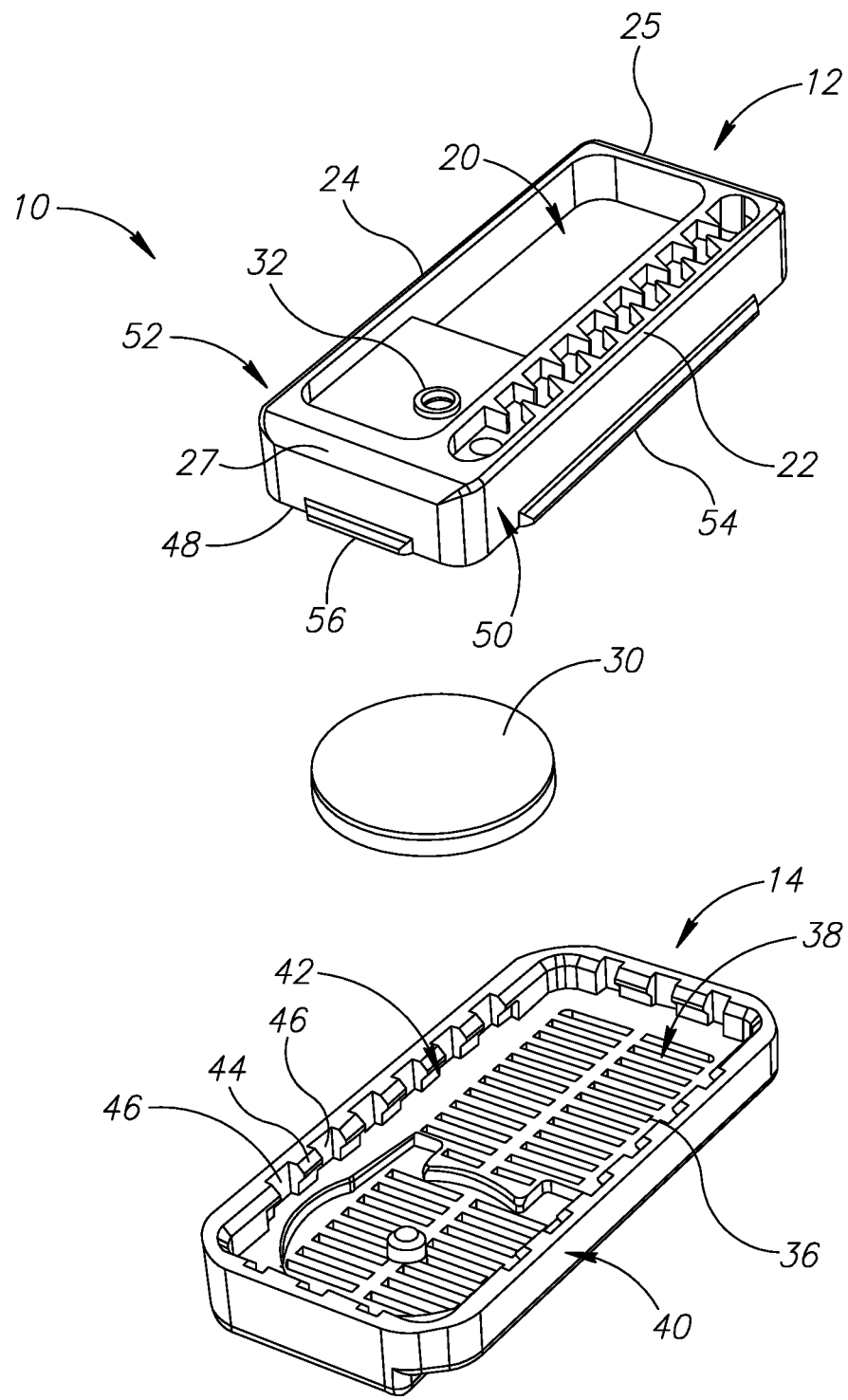
FIG. 2 schematically shows an exploded view of FIG. 1 revealing a membrane of the emitter.

Attention is now drawn to the exploded view of emitter 10 seen in FIG. 2 that schematically illustrates the first and second members of emitter 10 and a membrane 30 that in an assembled state of emitter 10 is interposed therebetween. First member 12 includes an outlet 32 of the emitter here seen emptying into exit pool 20. Second member 14 is formed with an inlet here embodied as a filter including a plurality of slots 36. Second member 14 includes a base 38 and a peripheral wall 40 that rises up above the base to enclose a recess 42, and the slots 36 of the inlet are formed along base 38 extending through base 38 opening at its inner side into recess 42 and at its other side to an outer side of member 14 (in this view not visible) that is adapted to face into a pipe in which emitter 10 is installed.

Wall 40 is formed along a periphery of its side facing into recess 42 with a plurality of teeth 44 projecting into the recess 42; and valleys 46 are formed on both sides of each tooth 44 in the peripheral direction. First part 12 has an inner side 48 (here not fully seen) and a peripheral surface 50 that extends a height distance from the inner side up towards the outer side 16. Peripheral surface 50 meets outer side 16 at a peripheral generally rectangular shaped edge 52 which includes the two longitudinal edges 22, 24 and two lateral edges 25, 27. Peripheral surface 50 includes along each one of its longitudinal sides a longitudinally extending ledge 54 and along each one of its lateral sides a lateral extending ledge 56, with all ledges 54, 56 being located possibly as seen here adjacent inner side 48.

With attention drawn back to FIG. 1 it is appreciated that in forming an assembled state of emitter 10, the first and second members 12, 14 are retained together by first urging the first member 12 into recess 42. Doing so brings the wall 40 of the second member 14 to enclose the peripheral surface 50 of the first member 12 and the teeth 44 of second member 14 to snap fit over the ledges 54, 56 of first member 12.

This forms an inter-engaging relationship where the teeth 44 bear against the ledges from above and by that maintain the first member 12 pressed against the second member 14. It is noted that provision of the valleys 46 on both sides of each tooth 44 increases flexibility of the teeth so that they may more easily flex when snapping onto the ledges and thus reduce likelihood of deformations in inter-engaging parts of the emitter that may occur (or be larger) if e.g. the valleys were absent.

Figure 3:
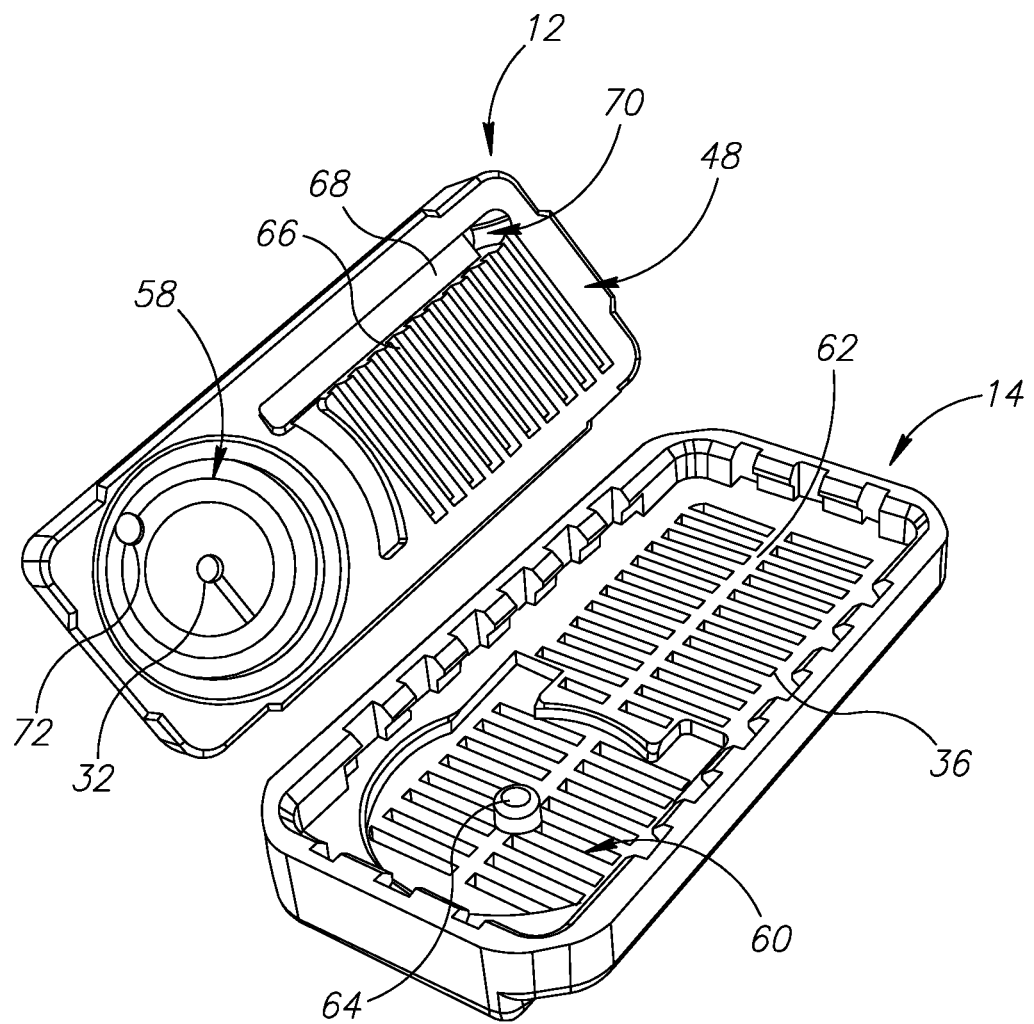
FIG. 3 schematically shows a separated view of the first and second members.

Attention is now drawn to FIG. 3. First member 12 is formed adjacent one of the longitudinal ends of its inner side 48 with a chamber 58 here in the form of a cylindrical cavity. Second member 14 is formed similarly adjacent one of the longitudinal ends of the inner side of base 38 facing into recess 42 with a chamber 60 here also in the form of a cylindrical cavity. Each chamber 58, 60 is preferably sized to have a lateral extension, here a diameter, which extends along almost a full lateral width of sides in which they are formed. Base 38 is formed with a central longitudinal extending rail 62 with the slots 36 being formed on lateral sides of the rail, and along rail 36 at a center of chamber 60 there is formed an upwardly projecting bulge 64.

Inner side 48 of member 12 has a plurality of laterally extending ducts 66 most seen here straight with the one adjacent chamber 58 being curved. The ducts all open into a longitudinally extending channel 68 generally located below the flow path 18 on the other outer side 16 of member 12 where it extends along edge 22. Channel 68 at an end distal to chamber 58 communicates via a bore 70 formed through first member 12 with the beginning 26 of flow path 18, and outlet 32 opens into a center of chamber 58 that in turn communicates via a bore 72 formed through member 12 with the end 28 of flow path 18.

Figure 4:
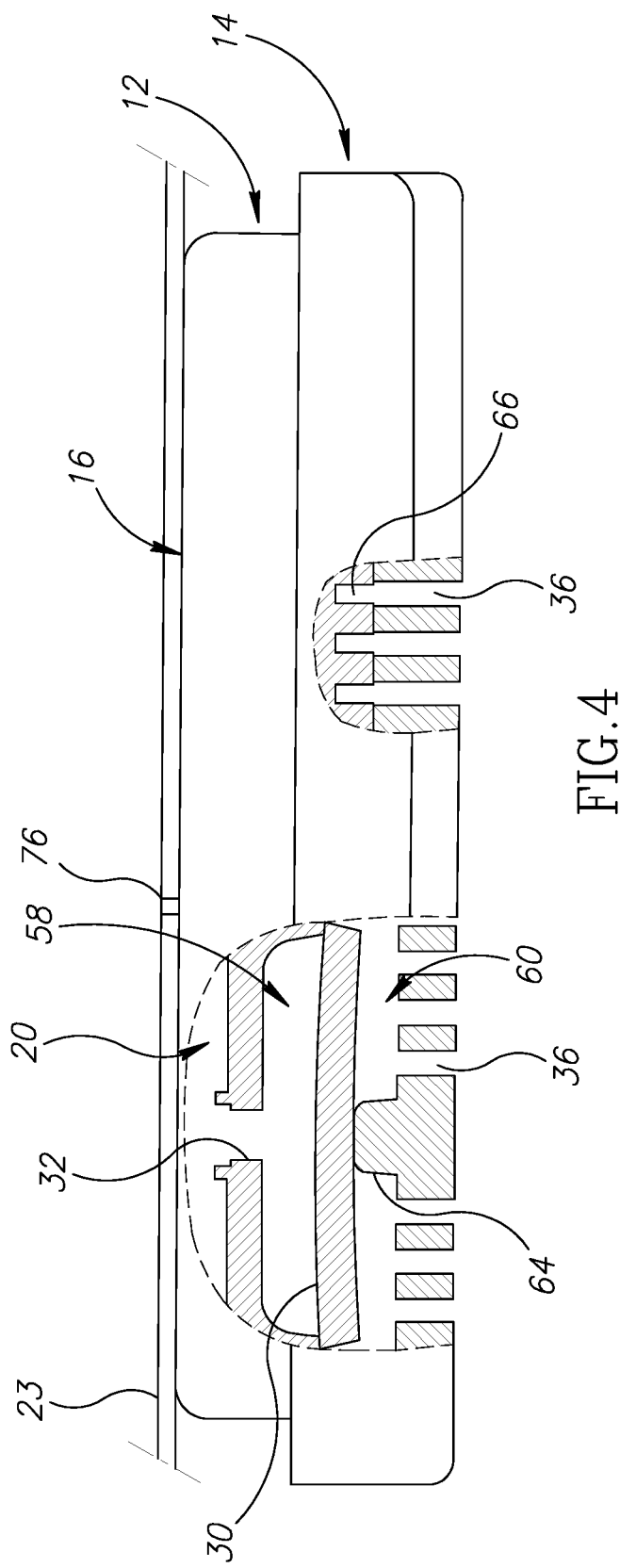
FIG. 4 schematically shows a lateral side view of the emitter of FIG. 1 in part cross section.

Attention is drawn to FIG. 4 showing a partial cross sectional view of an assembled state of emitter 10. In emitter 10, membrane 30 is located between chambers 58 and 60 and is pressed from beneath at its center by bulge 64 to ensure it is lifted above the slots 36 opening into chamber 60. A periphery of membrane 30 is bound by above by a part of first member 12 while being free from below to ensure that it performs proper bending during operation of the emitter. Chamber 58 that is sealed from beneath by membrane 30 forms a pressure regulating chamber of the emitter. Preferably, chamber 58 is formed, inter alia, laterally wide as possible on side 48 to improve pressure regulating properties of emitter 10.

In emitter 10 the slots 36 outside of chamber 60 are located aligned with corresponding ducts 66 of the first member 12 so that at least most slots 36 communicate each with an associated duct 66 from above. Also seen in this view is that emitter is attached to an inner face of the pipe 23 to which it is fitted and that exit pool 20 communicates with the outside environment via an aperture 76, here embodied as a hole, which is formed through the wall of the pipe.

During irrigation, pressurized liquid in pipe 23 enters emitter 10 via the slots 36 formed in the second member 14 and from there the liquid flows via the ducts 66 formed in first member 12 into channel 68. From the channel 68 liquid flows up via bore 70 into the beginning 26 of flow path 18. Liquid flowing downstream via flow path 18 reaches end 28 from where liquid flows back down via bore 72 into the pressure regulating chamber 58 of the emitter.

In chamber 58 the rate of liquid flowing onwards downstream out of the emitter via outlet 32 is regulated to be substantially independent of inlet pressure for a range of pressures to which emitter has been designed to operate. The mechanism of regulating the liquid rate exiting emitter 10 includes the bending of membrane 30 in response to liquid pressure acting on its side facing the slots 36, so that a rise or drop of pressure in the pipe, respectively, decreases or increases the available path for liquid to exit chamber 58 via outlet 32 to pool 20 and from there to the outside environment.

Figure 5A:
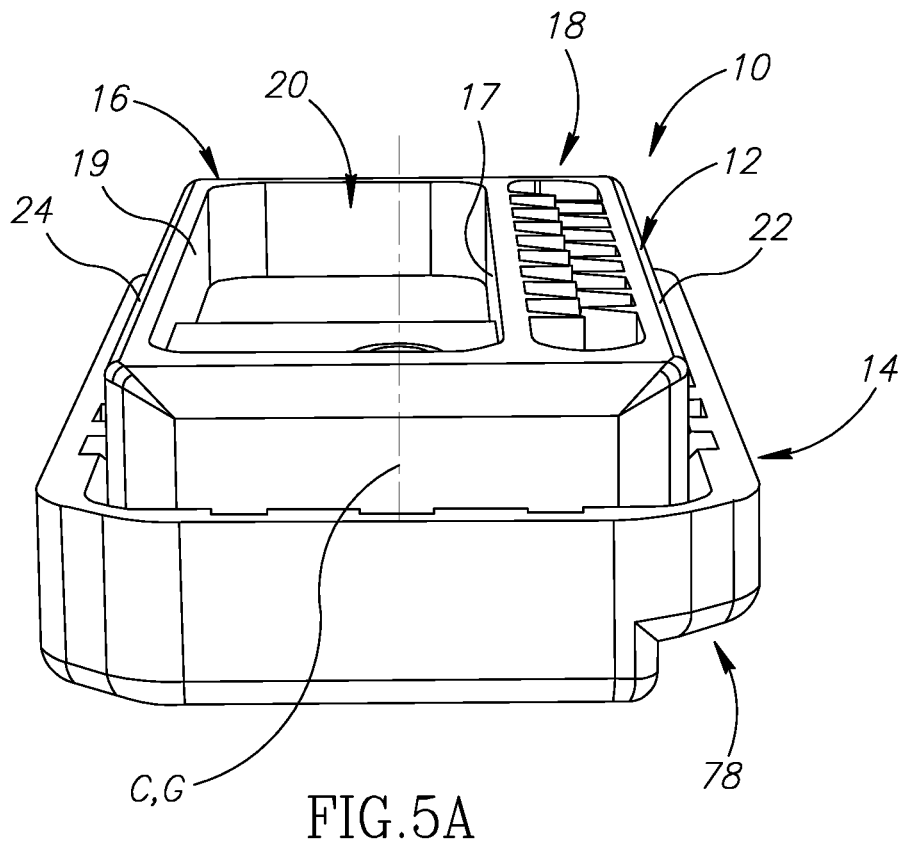
FIGS. 5A and 5B schematically show, respectively, another perspective view and a longitudinal side view of the emitter of FIG. 1.
Figure 5B:
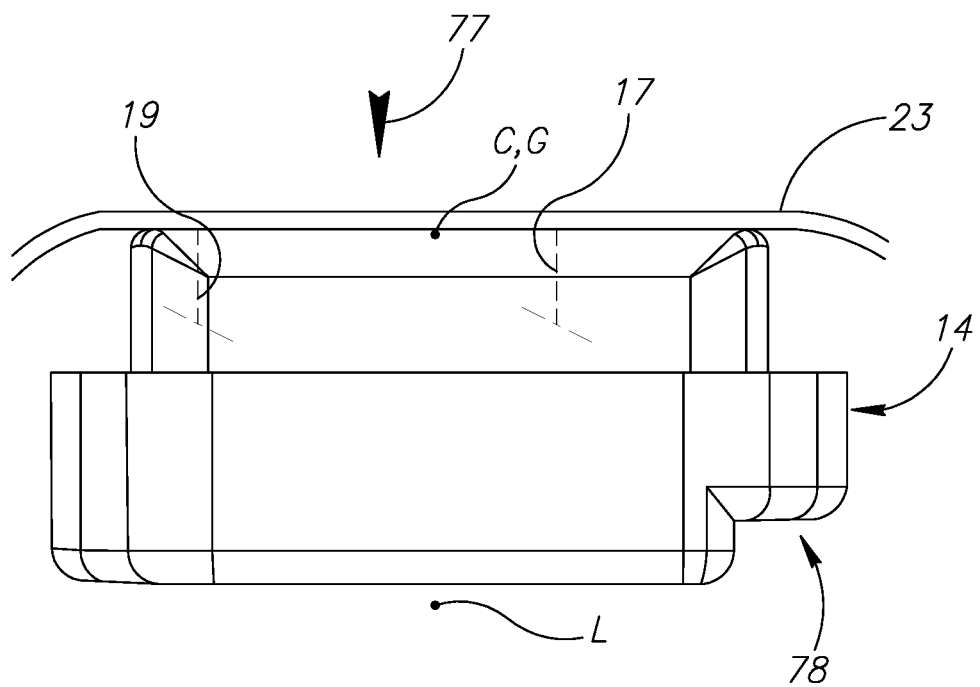

With attention drawn to FIGS. 5A and 5B it can be seen that emitter 10 may be formed with a longitudinally extending step 78 formed by material removed or missing from the outer side of second member 14. Due to step 78, emitter 10 is asymmetric in a view taken along the longitudinal axis G. This asymmetric shape of emitter 10 may assist in correctly orienting the emitter when or before being fitted to the inner side of the wall of pipe 23.

In FIGS. 5A and 5B axis G may also represent, in the embodiment here shown, a central axis C that defines a center of e.g. outer side 16 which is equally spaced from edges 22, 24. Exit pool 20 as seen e.g. in FIG. 5A is thus a-symmetrically located on outer side 16 since e.g. central axis C is not equally spaced from flanks 17, 19. In another possible form, exit pool 20 may be defined a-symmetrically formed about a plane (not illustrated), possible also being a median plane of the emitter, that includes axis C and perpendicularly intersects e.g. outer side 16.

Since the exit pool is a-symmetrically formed on outer side 16, it may be required to adjust orientation of emitters being installed to a pipe so that all emitters are fitted to the pipe with e.g. their exit pools oriented at a similar lateral side. Such adjustment of orientation may be assisted by the steps 78. In addition, it may be required to pre-set a position of a means 77 (schematically illustrated in FIG. 5B) configured for creating apertures 76 through the wall of pipe 23 during production of a pipe including drip emitters according to embodiments of the present invention.

Such a pre-set position of means 77 may be chosen to be also laterally set-aside from the axes C of the emitters being installed to the pipe, and/or also from a longitudinal central axis L of the pipe. Orienting means 77 to be set-aside may assist in creating apertures 76 at locations along the pipe that are substantially formed at more central positions of the exit pools of the emitters. Possibly, this more central position may aim at being generally at a lateral center of each pool 20 generally equally spaced from flanks 17, 19—in order to increase likelihood of actual formation of apertures at a lateral location above the exit pool in cases where e.g. lateral movement of the pipe (with emitters) occurs due e.g. to twisting of the pipe. Alignment between first and second members 12, 14 to ensure that all flow paths 18 are located e.g. at the same lateral side as e.g. step 78, may be performed by means such as optical means identifying e.g. the location of outlet 32, bore 70 and/or bore 72 and by that affecting correct assembly between the first and second members 12, 14 of emitter 10. Means 77 may be any means configured to perform apertures or cuts through a pipe, such as a drill, a laser arrangement, a cutting arrangement, or the like. Apertures 76 formed through the pipe may have any shape such as a circular hole, an ellipse, a slit or cut (etc).

By way of example, membrane 30 may be formed form a thermoset elastomeric material such as silicon, EPDM or the like. First member 12 that attaches to the pipe may preferably be formed from the same material as the pipe to ensure bonding. Typically, drip irrigating pipes are made of polyethylene and thus first member 12 may preferably also be formed from polyethylene. In embodiments where the pipe may be made from a different material such as polypropylene, first member 12 may accordingly also be formed form polypropylene. Second member on the other hand, may be formed from any plastic material such as also polyethylene, polypropylene, PA, PBT, PET, POM (or the like) since it may not be essential that it be formed from the same material in embodiments such as those here shown where it attaches to first member 12 by snap-fit engagement.

In an embodiment, second member 14 is made from material that is harder/stronger than first member 12 so that teeth 44 may be formed from a material better suited to maintain the snap-fit engagement against forces acting to separate members 12, 14 from their inter-engagement. For example, member 14 may be made from one of: polypropylene, PA, PBT, PET, POM while first member is made from polyethylene.

Figure 6A:
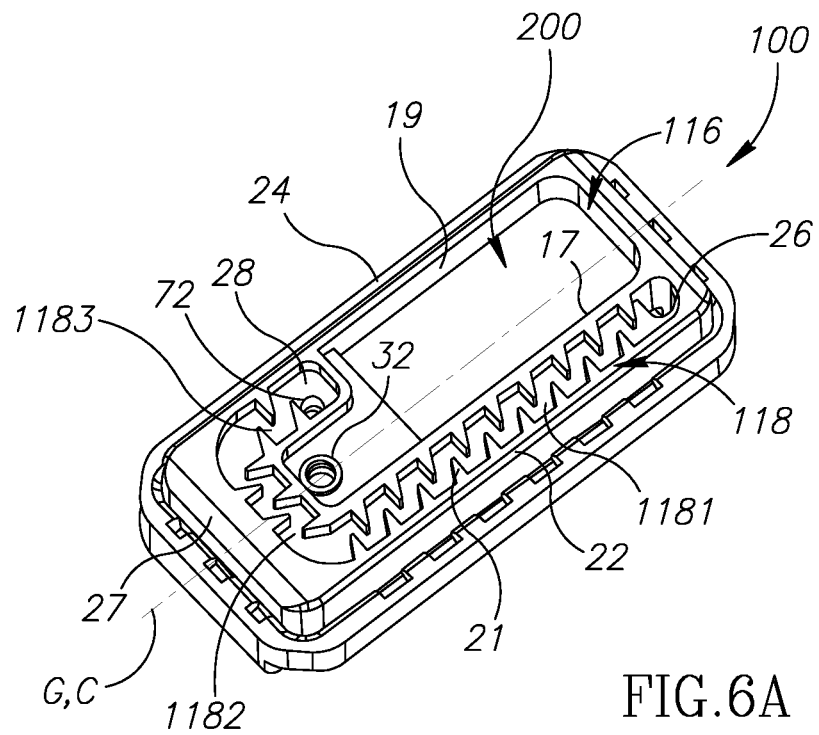
FIGS. 6A and 6B schematically show, respectively, a perspective top view and a separated view of first and second members forming another embodiment of an emitter in accordance with the present invention.
Figure 6B:
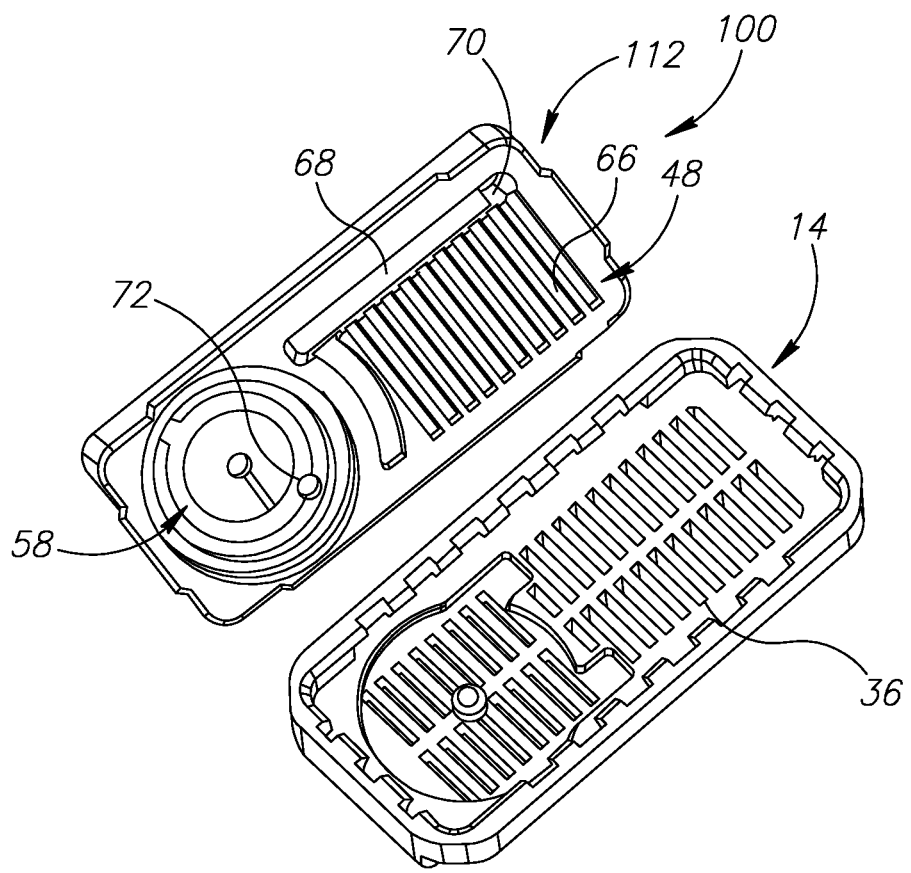

Attention is now drawn to FIGS. 6A and 6B showing another embodiment of an emitter 100 according to one form of the present invention. Emitter 100 is generally similar to emitter 10 previously discussed with generally similar features being indicated here with same numerals as before. Some features of emitter 100 which differences to e.g. their construction or arrangement in emitter 10, will now be observed, will be assigned new numerals. Emitter 100 at outer side 116 that is adapted to attach to the pipe includes a flow path 118 extending from a beginning 26 to an end 28. Flow path 118 has a first section 1181 extending longitudinally along substantially all edge 22 and a subsequent second section 1182 extending along lateral edge 27 and a terminal short third section 1183 that extends along a short portion of edge 24 in an opposing longitudinal direction.

Pressurized liquid in the pipe enters emitter 100 via the slots 36 formed in the second member 14 and from there the liquid flows via the ducts 66 formed in first member 112 of emitter 100 into channel 68. From channel 68 liquid flows up via bore 70 into the beginning 26 of flow path 118. Liquid flowing downstream via flow path 118 reaches end 28 from where the liquid can flow back down via bore 72 into the pressure regulating chamber 58 of emitter 100.

In emitter 100 a substantial length of exit pool 200 along axis G still stretches laterally between flanks 17, 19 that are located, respectively, adjacent first section 1181 of the flow path and edge 24 while a small area of exit pool 200 adjacent outlet 32 has e.g. a narrower lateral width bound between the first and third sections 1181, 1183 of the flow path. Emitter 100 by inclusion of the second and third sections of flow path 118 embodies a possible optimization of arrangement of liquid cavities on outer side 116. This arrangement may be seen as being aimed at the one hand at having a relatively longer flow path, here embodied having along all three sections 1181, 1182, 1183 arrays of opposing baffle teeth 21 for creating high resistance to liquid flow, while still maintaining relative large portion of exit pool 200 with a wide as possible lateral extension.

Consequently, emitter 100 has a longitudinal first member 112 with an outer side 116 for attaching to a pipe and an inner side 48 that includes a pressure regulating chamber or cavity 58. Chamber 58 is formed adjacent one longitudinal end of the emitter and flow path 118 extends along outer side 116 from its beginning 26 to its end 28 where it communicates with chamber 58 via bore 72. Beginning 26 is preferably adjacent the other longitudinal end of the emitter to increase as much as possible an effective length of the flow path and the flow path thus extends in this embodiment along a full length of only one edge 22 of outer side 116.

Figure 7A:
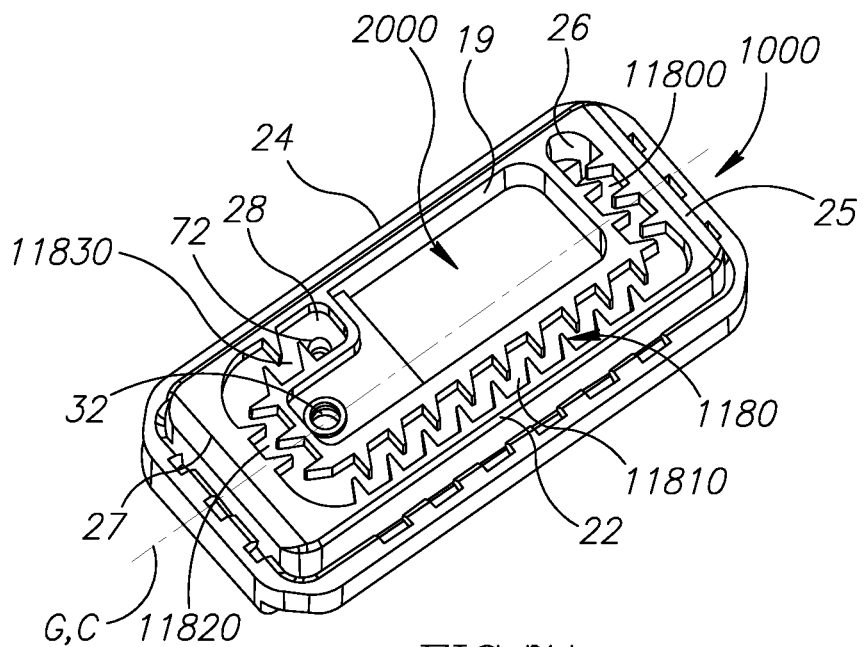
FIGS. 7A and 7B schematically show, respectively, a perspective top view and a separated view of first and second members forming yet another embodiment of an emitter in accordance with the present invention It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.
Figure 7B:
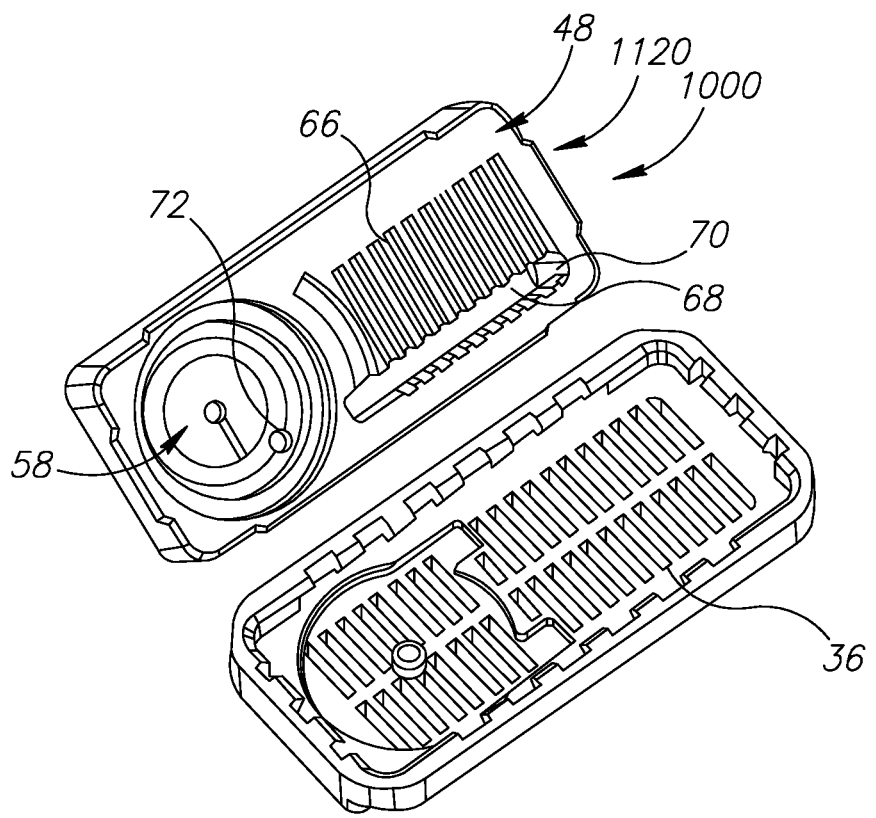

Attention is now drawn to FIGS. 7A and 7B showing yet another embodiment of an emitter 1000 according to another form of the present invention. Emitter 1000 is generally similar to emitter 100 with the addition of a first section 11800 of a flow path 1180 of this embodiment extending along edge 25. Emitter 1000 at its outer side that is adapted to attach to the pipe includes accordingly flow path 1180 extending here from a beginning 26 adjacent where edges 24 and 25 meet. The first section 11800 here accordingly extends laterally along edge 25 towards where edges 25 and 22 meet. A subsequent second section 11810 extends then along edge to meet a third section 11820 extending along lateral edge 27 that communicates with a terminal short fourth section 11830 that extends along a short portion of edge 24 in an opposing longitudinal direction.

In emitter 1000 a substantial length of exit pool 2000 along axis G still stretches laterally between flanks 17, 19 that are located, respectively, adjacent here section 11810 of the flow path and edge 24 while a small area of exit pool 2000 adjacent outlet 32 has e.g. a narrower lateral width bound between sections 11810 and 11830 of the flow path. Emitter 1000 by inclusion of the four section 11800, 11810, 11820 and 11830 of flow path 118 embodies a further possible optimization of arrangement of liquid cavities on the outer side. This arrangement may be seen as being aimed at the one hand at having an even longer flow path than in emitter 100 while slightly compromising on the size of exit pool 2000 however still maintaining a substantial portion of pool 2000 with wide lateral extension extending to edge 24.

As seen in FIG. 7B, the position of flow channel 68 on the inner side 48 of the first part 1120 of emitter 1000 is opposite to that in previous embodiments in order to lead liquid entering the inlet slots 36 of the emitter via bore 70 into the beginning 26 of flow path 1180 that accordingly starts here adjacent to intersection of edges 24 and 25 (and not adjacent intersection of edges 25 and 22 as in previous embodiments).

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Further more, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. A drip irrigation emitter extending between first and second longitudinal ends, the emitter comprising:
   a first member having an outer side for attaching to a pipe, and an inner side;
      the outer side comprising a peripheral surface comprising first and second longitudinal edges connected to first and second lateral edges, a longitudinal axis equally spaced between the first and second longitudinal edges and a lateral axis perpendicular to the longitudinal axis and equally spaced between the first and second lateral edges,
      the outer side comprising an exit pool, an outlet to the exit pool connecting the inner side to the outer side, and a pressure reducing flow path;
      the flow path comprising a first section which extends longitudinally along substantially all of the first longitudinal edge and is spaced apart from the longitudinal axis,
      the flow path having a flow path beginning and a flow path end, each provided with a bore connecting the outer side to the inner side;
   a second member extending between the first and second longitudinal ends and overlying the inner side of the first member; and
   a membrane interposed between the first and second members to provide flow regulation,
   wherein
   the exit pool on the outer side is asymmetrically arranged with respect to the longitudinal axis; and
   the emitter is asymmetric along the longitudinal axis, to assist in correctly orienting the emitter when or before being fitted to an irrigation pipe.

2. The drip emitter according to claim 1, wherein the flow path beginning and the flow path end are both formed in said first section.

3. The drip emitter according to claim 1, wherein the flow path further comprises:
   a second section connected to the first section, extending along a first lateral edge and crossing the longitudinal axis; and
   a terminal third section connected to the second section, extending along a short portion of the second longitudinal edge and spaced apart from the longitudinal axis.

4. The drip emitter according to claim 3, wherein the flow path further comprises:
   an additional section connected to said first section, extending along a second lateral edge and crossing the longitudinal axis;
   and wherein the flow path beginning is formed in said additional section and the flow path end is formed in said third section, such that the flow path beginning and the flow path end are both proximate the second longitudinal edge.

5. The drip emitter according to claim 4, wherein the pressure reducing flow path comprises arrays of opposing baffle teeth formed on all of said sections.

6. The drip emitter according to claim 1, wherein:
   the inner side of the first member comprises a channel extending along the first longitudinal edge, below the first section of the flow path formed on the opposite outer side;

the inner side of the first member further comprises a plurality of laterally extending ducts which open into said channel.

7. The drip emitter according to claim 1, wherein the exit pool on the outer side is asymmetrically arranged with respect to both the longitudinal axis and the lateral axis.

8. The drip emitter according to claim 1, wherein:
the lateral axis immediately crosses the flow path, then immediately thereafter crosses the exit pool, and then immediately thereafter reaches the second longitudinal edge.

9. The drip emitter according to claim 1, wherein the second member further comprises an upwardly projecting bulge to press the membrane from beneath at a center of the membrane.

10. A drip irrigation emitter extending between first and second longitudinal ends, the emitter comprising:
a first member having an outer side for attaching to a pipe, and an inner side;
the outer side comprising a peripheral surface comprising first and second longitudinal edges connected to first and second lateral edges, a longitudinal axis equally spaced between the first and second longitudinal edges and a lateral axis perpendicular to the longitudinal axis and equally spaced between the first and second lateral edges,
the outer side comprising an exit pool, an outlet to the exit pool connecting the inner side to the outer side, and a pressure reducing flow path;
the flow path comprising a first section which extends longitudinally along substantially all of the first longitudinal edge and is spaced apart from the longitudinal axis,
the flow path having a flow path beginning and a flow path end, each provided with a bore connecting the outer side to the inner side;
a second member extending between the first and second longitudinal ends and overlying the inner side of the first member; and
a membrane interposed between the first and second members to provide flow regulation,
wherein:
the exit pool on the outer side is asymmetrically arranged with respect to the longitudinal axis; and
the second member includes a longitudinally extending step such that the second member has an asymmetric shape in a view taken along the longitudinal axis.

11. A drip irrigation emitter extending between first and second longitudinal ends, the emitter comprising:
a first member having an outer side for attaching to a pipe, and an inner side;
the outer side comprising a peripheral surface comprising first and second longitudinal edges connected to first and second lateral edges, a longitudinal axis equally spaced between the first and second longitudinal edges and a lateral axis perpendicular to the longitudinal axis and equally spaced between the first and second lateral edges,
the outer side comprising an exit pool, an outlet to the exit pool connecting the inner side to the outer side, and a pressure reducing flow path;
the flow path comprising a first section which extends longitudinally along substantially all of the first longitudinal edge and is spaced apart from the longitudinal axis,
the flow path having a flow path beginning and a flow path end, each provided with a bore connecting the outer side to the inner side;
a second member extending between the first and second longitudinal ends and overlying the inner side of the first member; and
a membrane interposed between the first and second members to provide flow regulation,
wherein
the exit pool is laterally bound between two longitudinal and opposing facing flanks;
the two flanks are unequally spaced apart from the longitudinal axis; and
the two flanks are unequally spaced from respective adjacent longitudinal edges of the outer side.

12. The drip emitter according to claim 11, wherein the flow path beginning and the flow path end are both formed in said first section.

13. The drip emitter according to claim 11, wherein the flow path further comprises:
a second section connected to the first section, extending along a first lateral edge and crossing the longitudinal axis; and
a terminal third section connected to the second section, extending along a short portion of the second longitudinal edge and spaced apart from the longitudinal axis.

14. The drip emitter according to claim 13, wherein the flow path further comprises:
an additional section connected to said first section, extending along a second lateral edge and crossing the longitudinal axis;
and wherein the flow path beginning is formed in said additional section and the flow path end is formed in said third section, such that the flow path beginning and the flow path end are both proximate the second longitudinal edge.

15. The drip emitter according to claim 14, wherein the pressure reducing flow path comprises arrays of opposing baffle teeth formed on all of said sections.

16. The drip emitter according to claim 11, wherein:
the inner side of the first member comprises a channel extending along the first longitudinal edge, below the first section of the flow path formed on the opposite outer side;
the inner side of the first member further comprises a plurality of laterally extending ducts which open into said channel.

17. The drip emitter according to claim 11, wherein the exit pool on the outer side is asymmetrically arranged with respect to both the longitudinal axis and the lateral axis.

18. The drip emitter according to claim 11, wherein:
the lateral axis immediately crosses the flow path, then immediately thereafter crosses the exit pool, and then immediately thereafter reaches the second longitudinal edge.

19. The drip emitter according to claim 11, wherein the second member includes a longitudinally extending step such that the second member has an asymmetric shape in a view taken along the longitudinal axis.

20. The drip emitter according to claim 11, wherein the second member further comprises an upwardly projecting bulge to press the membrane from beneath at a center of the membrane.

* * * * *